United States Patent
Huang

(10) Patent No.: US 11,087,758 B2
(45) Date of Patent: Aug. 10, 2021

(54) METHOD AND VOICE INPUT APPARATUS FOR CONVERTING VOICE INPUT TO TEXT INPUT

(71) Applicant: SHENZHEN DONGTING AUTOMOBILE BROKERAGE CO., LTD., Shenzhen (CN)

(72) Inventor: Yuling Huang, Shenzhen (CN)

(73) Assignee: SHENZHEN DONGTING AUTOMOBILE BROKERAGE CO., LTD., Shenzhen (CN)

( * ) Notice: Subject to any disclaimer, the term of this patent is extended or adjusted under 35 U.S.C. 154(b) by 208 days.

(21) Appl. No.: 16/507,051

(22) Filed: Jul. 10, 2019

(65) Prior Publication Data

US 2019/0333511 A1 Oct. 31, 2019

Related U.S. Application Data

(63) Continuation of application No. PCT/CN2017/120424, filed on Dec. 31, 2017.

(30) Foreign Application Priority Data

Jan. 19, 2017 (CN) .......................... 201710038976.1

(51) Int. Cl.
| | | |
|---|---|---|
| *G10L 21/00* | (2013.01) | |
| *G10L 25/00* | (2013.01) | |
| *G10L 15/22* | (2006.01) | |
| *G06F 3/16* | (2006.01) | |
| *G10L 15/26* | (2006.01) | |

(52) U.S. Cl.
CPC .............. *G10L 15/22* (2013.01); *G06F 3/167* (2013.01); *G10L 15/26* (2013.01); *G10L 2015/223* (2013.01)

(58) Field of Classification Search
CPC ... G10L 15/22; G10L 15/26; G10L 2015/223; G06F 3/167; G06F 3/0233; G06F 40/151
USPC .......... 704/275, 270, E21.001, 235; 340/7.1, 340/573.1, 7.51, 7.52; 455/41.2, 567, 455/550.1, 418; 379/142.06; 705/14.17, 705/39
See application file for complete search history.

(56) References Cited

U.S. PATENT DOCUMENTS

| | | | |
|---|---|---|---|
| 2012/0069131 A1* | 3/2012 | Abelow | G06Q 10/067 348/14.01 |
| 2015/0154958 A1* | 6/2015 | Hu | G10L 15/05 704/235 |

FOREIGN PATENT DOCUMENTS

| | | |
|---|---|---|
| CN | 102262524 A | 11/2011 |
| CN | 102541504 A | 7/2012 |
| CN | 102566762 A | 7/2012 |
| CN | 103902056 A | 7/2014 |
| CN | 104810015 A | 7/2015 |
| CN | 106024014 A | 10/2016 |
| CN | 106341532 A | 1/2017 |
| CN | 106896933 A | 6/2017 |

* cited by examiner

*Primary Examiner* — Charlotte M Baker
(74) *Attorney, Agent, or Firm* — IPro, PLLC

(57) ABSTRACT

A method includes: acquiring a voice signal; sending the voice signal to a host; receiving a key code from the host; converting the key code to an identification code that is identified by the host; and sending the identification code to the host.

8 Claims, 6 Drawing Sheets

METHOD AND VOICE INPUT APPARATUS FOR CONVERTING VOICE INPUT TO TEXT INPUT

This disclosure is a continuation of International Patent Application No. PCT/CN2017/120424, filed on Dec. 13, 2017, which is based upon and claims priority to Chinese Patent Application No. 201710038976.1, filed on Jan. 19, 2017, the entire contents of which are incorporated herein by reference.

TECHNICAL FIELD

Embodiments of the present application relate to the technical field of information processing, and in particular, relate to a method and a voice input apparatus for converting a voice input to a text input.

BACKGROUND

At present, in such electronic equipments as a computer, a tablet computer and the like, text input is generally practiced by manual typewriting with a keyboard. Based on the working principle of the keyboards, the keyboards may be categorized into coded keyboards and non-coded keyboards. Regardless of which keyboard category, the functions thereof may be generally implemented by several individual modules. A keyboard position scanning module is configured to scan a key position. A decoding module is configured to generate a key code according to the key position, and convert the key code to an identification code that is identified by a host. A communication module is configured to send the identification code to the host (for example, a computer, a tablet computer or the like), and receive a control command from the host. The host is configured to receive the identification code, and convert the identification code to practice text input.

During practice of the present application, the inventors have found that the related art has at least the following problems: Text input needs to be practiced by manual typewriting with the keyboard, and it is difficult for users who have no knowledge of language input methods and are hand handicapped. Even for healthy users who have good knowledge of the language input methods, the users may feel fatigued if they typewrite with the keyboard for a long time.

SUMMARY

The embodiments of the present invention provide a method for converting a voice input into a text input, the method includes: acquiring a voice signal; sending the voice signal to a host; receiving a key code from the host; converting the key code to an identification code that is identified by the host; and sending the identification code to the host.

DETAILED DESCRIPTION

For clearer descriptions of the objectives, technical solutions and advantages of the embodiments of the present application, the technical solutions according to the embodiments of the present application are clearly and thoroughly described with reference to the accompanying drawings of the embodiments of the present application. The described embodiments are merely exemplary ones, but are not all the embodiments of the present application. Based on the embodiments of the present application, all other embodiments derived by persons of ordinary skill in the art without any creative efforts shall fall within the protection scope of the present application.

A method and device for converting a voice input to a text input according to the embodiments of the present application are applicable to a scenario where a voice signal is input via a voice input apparatus and then text input is practiced on an electronic equipment. The voice input apparatus and the electronic equipment may be connected via a wired fashion, a wireless fashion or a Bluetooth fashion. The electronic equipment (host hereinafter) may be a equipment equipped with an Android, Windows or Mac system, for example, a computer, a television, a player, an OTT box, a mobile phone, a tablet computer, an all-in-one PC or the like; and the voice input apparatus may be a keyboard, a mouse, a Bluetooth headphone, a microphone, an ipcamera (network camera), a camera microphone or the like.

Figure 1:
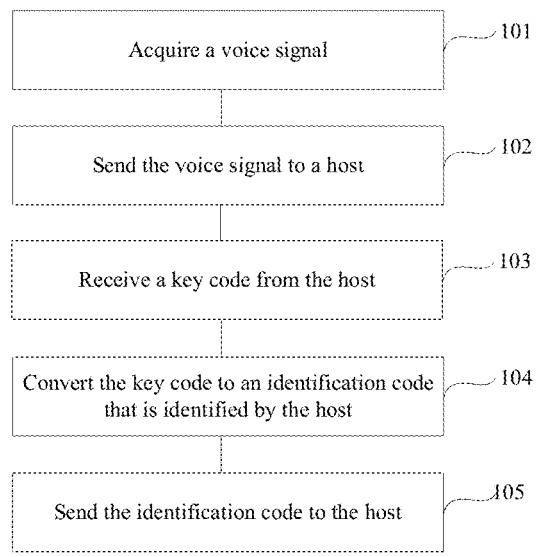
FIG. 1 is a schematic flowchart of a method for converting a voice input to a text input according to an embodiment of the present application.

As illustrated in FIG. 1, an embodiment of the present application provides a method for converting a voice input to a text input. The method may be applied to a voice input apparatus. The method includes the following steps:

Step 101: A voice signal is acquired.

In practice, a microphone for receiving a sound signal may be arranged on a voice input apparatus, for example, a keyboard, and in addition, a key is set or an original key on the keyboard is used. When the key is pressed, voice recoding is started; and when the key is released, voice recording is terminated. As such, a segment of voice signals is acquired. In a scenario where the voice input apparatus is a mouse, a microphone for receiving a sound signal may be arranged on a voice input apparatus, a key is set or an original key on the mouse is used. When the key is pressed, voice recoding is started; and when the key is released, voice recording is terminated. As such, a segment of voice signals is acquired.

Step 102: The voice signal is sent to a host.

The host refers to an electronic equipment such as a computer, a tablet computer or the like. In practice, a sending unit may be arranged in the voice input apparatus, for example, the keyboard or the mouse, wherein the sending unit is configured to send the voice signal to the host via a wired fashion, a wireless fashion or a Bluetooth fashion.

Step 103: A key code is received from the host.

Upon receiving the voice signal from the voice input apparatus, the host converts the voice signal to a corresponding text character. Optionally, the host may convert the text character to a key code corresponding to the text character, and then send the key code to the voice input apparatus; or the host may directly paste the text character to a clipboard, then generate a key code corresponding to the paste command, and finally send the key code to the voice input apparatus, such that the voice input apparatus performs a paste operation. In practice, a receiving unit may also be arranged in the keyboard or the mouse or the like voice input apparatus, wherein the receiving unit is configured to receive the key code from the host via a wired fashion, a wireless fashion or a Bluetooth fashion.

Step 104: The key code is converted to an identification code that is identified by the host.

The key code sent by the host is converted to an identification code that is identified by the host (for example, an ASCII code). In practice, where the voice input apparatus is a keyboard, the key code may be converted by a decoding module in the keyboard to an identification code that is identified by the host; and where another voice input apparatus is used, a decoding module may be additionally arranged. The key code may be converted to the identification code by using the additionally arranged decoding module.

Step 105: The identification code is sent to the host.

The identification code is sent to the host. The host receives the identification code and converts the identification code to achieve input of the text character. In practice, where the voice input apparatus is a keyboard, the identification code may be sent by a communication module in the keyboard to the host; and where another voice input apparatus is used, a communication module may be additionally arranged. The key code may be sent to the host by using the additionally arranged communication module.

In the embodiment of the present application, a voice signal is acquired and then sent to the host, the host processes the voice signal to generate a corresponding key code, and text input is practiced based on the key code after the key code is received from the host. In this process, no manual typewriting with the keyboard is needed, and thus convenience is brought to the user.

Figure 2:
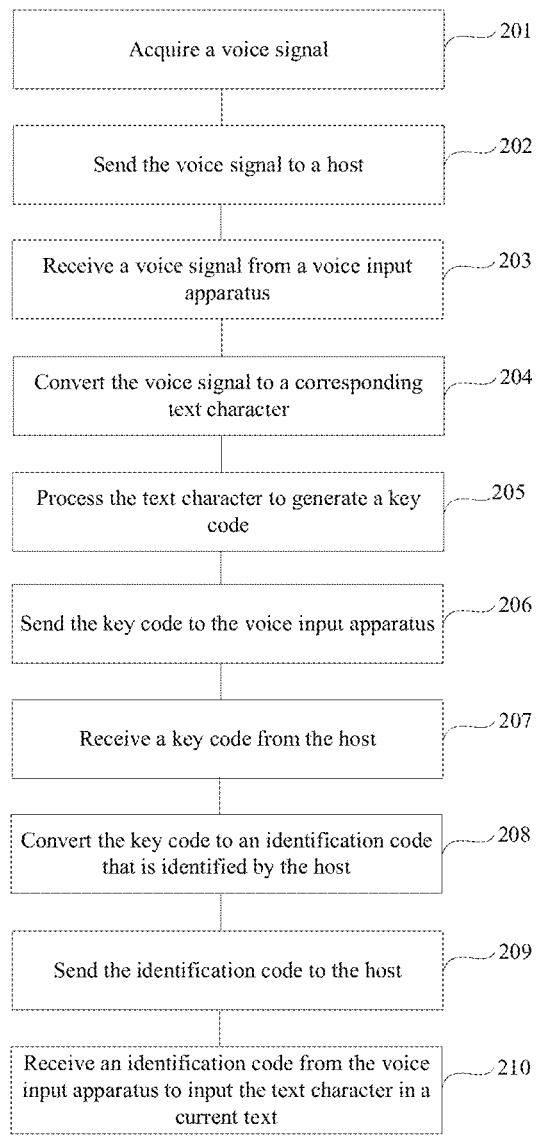
FIG. 2 is a schematic flowchart of a method for converting a voice input to a text input according to another embodiment of the present application.

As illustrated in FIG. 2, a schematic flowchart of an embodiment of the method is given. In this embodiment, the method includes the following steps:

Step 201: A voice signal is acquired.

Step 202: The voice signal is sent to a host.

Step 203: A voice signal is received from a voice input apparatus.

The step of receiving the voice signal from the voice input apparatus may be performed via software based on the conventional hardware.

Step 204: The voice signal is converted to a corresponding text character.

The voice signal is converted to the text character by the voice identification technology.

Step 205: The text character is processed to generate a key code.

Optionally, the host may convert the text character to a key code corresponding to the text character, or the host may directly paste the text character to a clipboard, and then generate a key code corresponding to the paste command.

Step 206: The key code is sent to the voice input apparatus.

The step of sending the key code to the voice input apparatus may be performed via software based on the conventional hardware.

Step 207: A key code is received from the host.

Step 208: The key code is converted to an identification code that is identified by the host.

Step 209: The identification code is sent to the host.

Step 210: An identification code is received from the voice input apparatus to input the text character.

With respect to text character input, the text character may be input to a current text of the host, wherein the current text refers to a text positioned by the cursor. The text may be a word file, a text file, a PPT file or the like in which text input may be practiced.

Steps 201, 202, 207, 208 and 209 may be performed on the voice input apparatus, and steps 203, 204, 205, 206 and 210 may be performed on the host.

Compared with the related art in which a key position is scanned and a key code is generated according to the key position, in the embodiment of the present application, a voice signal is converted to a corresponding text character, the text character is converted to a key code, and text input is practiced based on the key code. In this process, no manual typewriting with the keyboard is needed, and thus convenience is brought to the user.

In some embodiments of the method, the converting the voice signal to a corresponding text character includes:

identifying and converting the voice signal based on a language category of a host system to a corresponding test character;

that is, the voice signal may be in Chinese, English, Japanese or the like, when the host carries out voice identification, voice identification may be carried out based on the language category of the system, that is, if the system language is Chinese, the voice signal is identified Chinese rules, and if the system language is English, the voice signal is identified based on English rules;

or;

identifying and converting the voice signal based on a predefined language category to a corresponding test character.

The method for voice identification based on the system language category is not applicable to a scenario where the system language is Chinese but a user desires to input English. Therefore, an option for defining the language category may be arranged, and voice identification may be performed based on a defined language category. In this way, no matter whether the user desires to input Chinese, English or Japanese, voice identification for the corresponding language may be practiced as long as a corresponding language category is defined.

Figure 3:
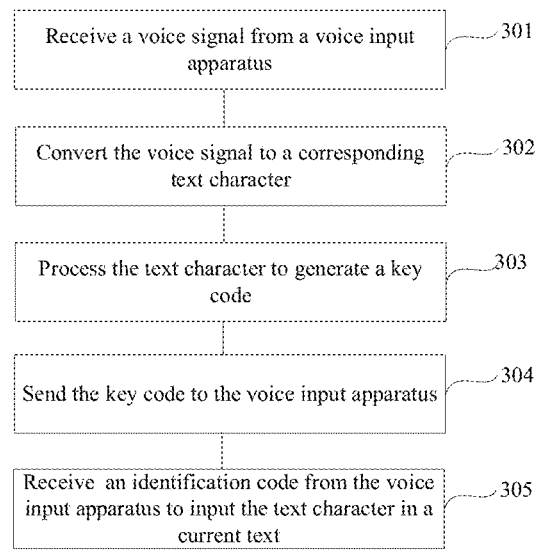
FIG. 3 is a schematic flowchart of a method for converting a voice input to a text input according to another embodiment of the present application.

Correspondingly, as illustrated in FIG. 3, an embodiment of the present application further provides a method for converting a voice input to a text input. The method may be applied to a host. The method includes the following steps:

Step 301: A voice signal is received from a voice input apparatus.

The step of receiving the voice signal from the voice input apparatus may be performed via software based on the conventional hardware.

Step 302: The voice signal is converted to a corresponding text character.

The voice signal is converted to the text character by the voice identification technology. Optionally, in practice, the voice signal may be identified and converted to a corresponding text character based on a language category of the host system; or the voice signal may be converted to a corresponding text character based on a predefined language category.

Step 303: The text character is processed to generate a key code.

Optionally, the host may convert the text character to a key code corresponding to the text character, or the host may directly paste the text character to a clipboard, and then generate a key code corresponding to the paste command.

Step 304: The key code is sent to the voice input apparatus.

The step of sending the key code to the voice input apparatus may be performed via software based on the conventional hardware.

Step 305: An identification code is received from the voice input apparatus to input the text character.

With respect to text character input, the text character may be input to a current text of the host, wherein the current text refers to a text positioned by the cursor. The text may be a word file, a text file, a PPT file or the like in which text input may be practiced.

Compared with the related art in which a key position is scanned and a key code is generated according to the key position, in the embodiment of the present application, a voice signal is received from the voice input apparatus, the voice signal is converted to a corresponding text character, the text character is converted to a key code, and text input is practiced based on the key code. In this process, no manual typewriting with the keyboard is needed, and thus convenience is brought to the user.

Figure 4:
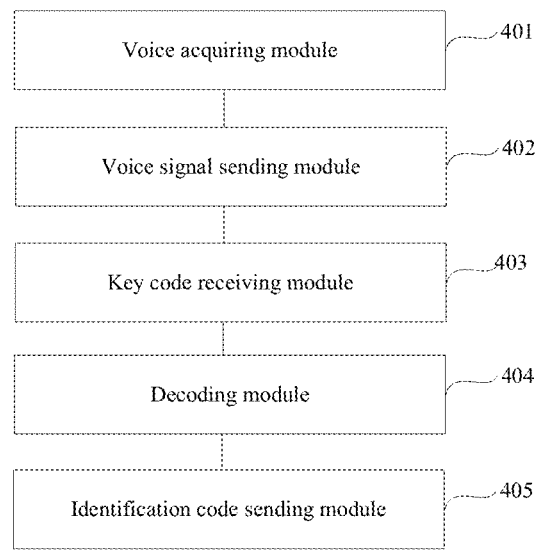
FIG. 4 is a schematic structural diagram of a device for converting a voice input to a text input according to an embodiment of the present application.

Correspondingly, as illustrated in FIG. 4, an embodiment of the present application further provides a device for converting a voice input to a text input. The device may be arranged in a voice input apparatus. The device includes:

a voice acquiring module 401, configured to acquire a voice signal;

a voice signal sending module 402, configured to send the voice signal to a host;

a key code receiving module 403, configured to receive a key code from the host;

a decoding module 404, configured to convert the key code to an identification code that is identified by the host; and an identification code sending module 405, configured to send the identification code to the host.

The voice acquiring module 401 acquires a voice signal, and the voice signal sending module 402 sends the voice signal to the host. The host processes the voice signal to generate a corresponding key code. Optionally, the host may convert the text character to a key code corresponding to the text character, and then send the key code to the voice input apparatus; or the host may directly paste the text character to a paste clipboard, then generate a key code corresponding to the paste command, and finally send the key code to the voice input apparatus. The key code receiving module 403 receives a key code from the host, and the decoding module 404 converts the key code to generate an identification code that is identified by the host.

In the embodiment of the present application, a voice signal is acquired and then sent to the host, the host processes the voice signal to generate a corresponding key code, and text input is practiced based on the key code after the key code is received from the host. In this process, no manual typewriting with the keyboard is needed, and thus convenience is brought to the user.

Figure 5:
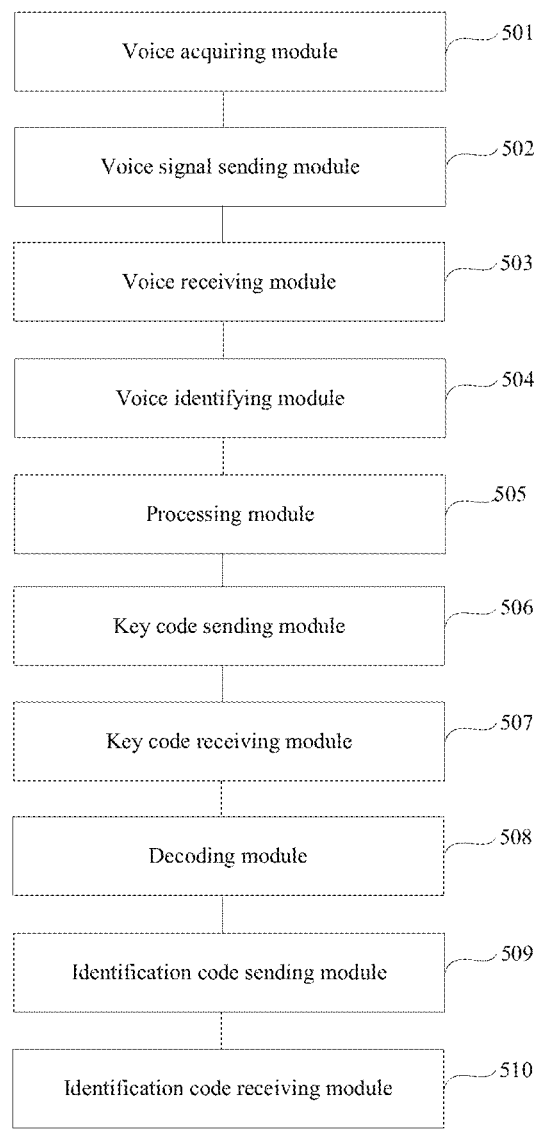
FIG. 5 is a schematic structural diagram of a device for converting a voice input to a text input according to another embodiment of the present application.

As illustrated in FIG. 5, a schematic structural diagram of an embodiment of the device is given. In this embodiment, the device includes:

a voice acquiring module 501, configured to acquire a voice signal;

a voice signal sending module 502, configured to send the voice signal to a host;

a voice receiving module 503, configured to receive a voice signal from a voice input apparatus;

a voice identifying module 504, configured to convert the voice signal to a corresponding text character;

a processing module 505, configured to process the text character to generate a key code;

a key code sending module 506, configured to send the key code to the voice input apparatus; and a key code receiving module 507, configured to receive a key code from the host;

a decoding module 508, configured to convert the key code to an identification code that is identified by the host;

an identification code sending module 509, configured to send the identification code to the host; and an identification code receiving module 510, configured to receive an identification code from the voice input apparatus to input the text character.

The voice acquiring module 501 acquires a voice signal, and the voice signal sending module 502 sends the voice signal to the host. The host receives a voice signal from the voice input apparatus via the voice receiving module 503, converts the voice signal to a corresponding text character via the voice identifying module 504, and processes the text character to generate a key code via the processing module 505.

The key code sending module 506 sends the key code to the voice input apparatus. The voice input apparatus receives a key code from the host via the key code receiving nodule 507, converts the key code to an identification code that is identified by the host via the decoding module 508, and sends the identification code to the host via the identification code sending module 509. The host receives the identification code from the voice input apparatus via the identification code receiving module 510. In this way, text character input is practiced.

The voice receiving module 501, the voice signal sending module 502, the key code receiving module 507, the decoding module 508 and the identification code sending module 509 may be arranged in the voice input apparatus; and the voice receiving module 503, the voice identifying module 504, the processing module 505, the key code sending module 506, and the identification code receiving module 510 may be arranged in the host.

Compared with the related art in which a key position is scanned and a key code is generated according to the key position, in the embodiment of the present application, a voice signal is converted to a corresponding text character, the text character is converted to a key code, and text input is practiced based on the key code. In this process, no manual typewriting with the keyboard is needed, and thus convenience is brought to the user.

Figure 6:
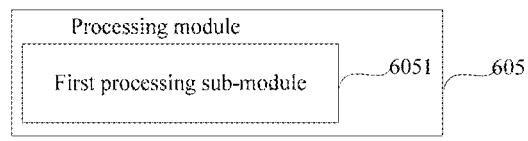
FIG. 6 is a schematic structural diagram of a processing module of a device for converting a voice input to a text input according to an embodiment of the present application.

Optionally, as illustrated in FIG. 6, in some embodiments of the device, the processing module 605 includes:

a first processing sub-module 6051, configured to convert the text character to a key code corresponding to the text character.

That is, the host converts the voice signal to a corresponding text character via the voice identifying module, converts the text character to a key code corresponding to the text character, and then sends the key code to the voice input apparatus via the key code sending module.

Figure 7:
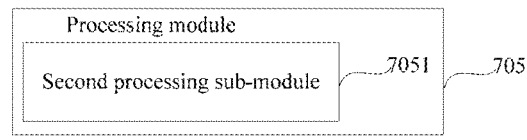
FIG. 7 is a schematic structural diagram of a processing module of a device for converting a voice input to a text input according to another embodiment of the present application.

Optionally, as illustrated in FIG. 7, in some embodiments of the device, the processing module 705 includes:

a second processing sub-module 7051, configured to paste the text character to a clipboard to generate a key code corresponding to the paste command.

That is, upon converting the voice signal to a corresponding text character via the voice identifying module, the host directly pastes the text character to a clipboard, then generate a key code corresponding to the paste command, and finally sends the key code to the voice input apparatus via the key code sending module, such that the voice input apparatus performs a paste operation.

Optionally, in some embodiments of the device, the voice identifying module includes:

a first voice identifying sub-module, configured to identify and convert the voice signal to a corresponding test character based on a language category of a host system; or a second voice identifying sub-module, configured to identify and convert the voice signal to a corresponding test character based on a predefined language category.

Correspondingly, an embodiment of the present application further provides a device for converting a voice input to a text input. The device includes:

a voice receiving module 801, configured to receive a voice signal from a voice input apparatus;

a voice identifying module 802, configured to convert the voice signal to a corresponding text character;

a processing module 803, configured to process the text character to generate a key code;

a key code sending module 804, configured to send the key code to the voice input apparatus; and an identification code receiving module 805, configured to receive an identification code from the voice input apparatus to input the text character.

Compared with the related art in which a key position is scanned and a key code is generated according to the key position, in the embodiment of the present application, a voice signal is received from the voice input apparatus, the voice signal is converted to a corresponding text character, the text character is converted to a key code, and text input is practiced based on the key code. In this process, no manual typewriting with the keyboard is needed, and thus convenience is brought to the user.

Optionally, in some embodiments of the device, the processing module includes:

a first processing sub-module, configured to convert the text character to a key code corresponding to the text character.

Optionally, in some embodiments of the device, the processing module includes:

a second processing sub-module, configured to paste the text character to a clipboard to generate a key code corresponding to the paste command.

It should be noted that since the device embodiments and the method embodiments according to the present application are based on the same inventive concept, technical content in the method embodiments is also applicable to the device embodiments. Therefore, the identical technical content in the device embodiments and the method embodiments is not described herein any further.

Figure 9:
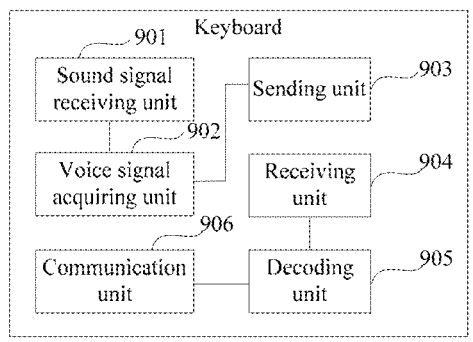
FIG. 9 is a schematic structural diagram of a voice input apparatus according to an embodiment of the present application.

Correspondingly, as illustrated in FIG. 9, an embodiment of the present application further provides a voice input apparatus. The voice input apparatus includes:

a sound signal receiving unit 901, configured to receive a sound signal;

a voice signal acquiring unit 902, communicably connected to the sound signal receiving unit 901, and configured to process the sound signal to acquire a voice signal;

a sending unit 903, communicably connected to the voice signal acquiring unit 902, and configured to send the voice signal to a host;

a receiving unit 904, configured to receive a key code from the host;

a decoding unit 905, connected to the receiving unit 904, and configured to convert the key code to generate an identification code that is identified by the host; and a communication unit 906, connected to the decoding unit 905, and configured to send the identification code to the host.

The voice input apparatus may be a keyboard, a mouse, a microphone, an ipcamera (network camera), or a camera microphone with a voice function. The voice signal receiving unit may receive the voice signal via the microphone, the function of the voice signal acquiring unit may be implemented by a key additionally arranged on the voice input apparatus or an original key on the keyboard. When the key is pressed, voice recording is started; and when the key is released, voice recording is terminated. As such, a segment of voice signals is acquired. The receiving unit and the communication units may be communicate modules supporting the wired, wireless or Bluetooth technology. Where the voice input apparatus is a keyboard, the decoding unit and the communication unit may employ the decoding module and the communication module existing in the keyboard. Where another voice input apparatus is used, a decoding unit and a communication unit that have the same functions as the decoding module and the communication module apparatus in the keyboard may be additionally arranged in the voice input apparatus to convert the key code to the identification code and send the identification code to the host.

In the embodiment of the present application, the voice input apparatus acquires a voice signal and then send the voice signal to the host, the host processes the voice signal to generate a corresponding key code, and text input is practiced based on the key code after the key code is received from the host. In this process, no manual typewriting with the keyboard is needed, and thus convenience is brought to the user.

Figure 10:
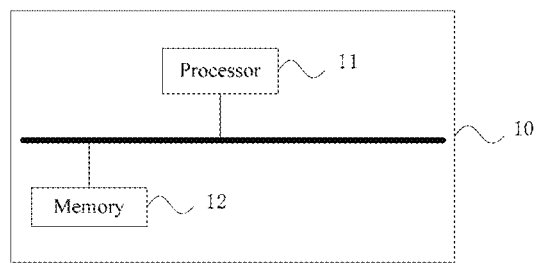
FIG. 10 is a schematic structural diagram illustrating hardware of an electronic equipment for performing the method for converting a voice input to a text input according to an embodiment of the present application.

FIG. 10 is a schematic structural diagram illustrating hardware of an electronic equipment 10 for performing the method for converting a voice input to a text input according to an embodiment of the present application.

As illustrated in FIG. 10, the electronic equipment 10 includes at least one processor 11 and a memory 10, and FIG. 10 uses one processor 11 as an example.

The at least one processor 11 and the memory 12 may be connected via a bus or in another manner, and FIG. 10 is an example of a bus connection.

The memory 12, as a non-volatile computer readable storage medium, may be configured to store non-volatile software programs, non-volatile computer executable programs and modules, for example, the program instructions/modules (for example, the voice acquiring module 401, the voice signal sending module 402, the key code receiving module 403, the decoding module 404 and the identification code sending module 405 as illustrated in FIG. 4) corresponding to the methods for converting a voice input to a text input in the embodiments of the present application. The non-volatile software programs, instructions and modules stored in the memory 12, when being executed, cause the processor 11 to perform various function applications and data processing of a server, that is, performing the methods for converting a voice input to a text input according to the above method embodiments.

The memory 12 may include a program memory area and data memory area, wherein the program memory area may store operation systems and application programs needed by at least one function; and the data memory area may store data created according to the use of the apparatus for converting a voice input to a text input. In addition, the memory 12 may include a high speed random access memory, or include a non-volatile memory, for example, at least one disk storage device, a flash memory device, or another non-volatile solid storage device. In some embodiments, the memory 12 optionally includes memories remotely configured relative to the processor 11. These memories may be connected to the apparatus for converting a voice input to a text input over a network. Examples of the above network include, but not limited to, the Internet, Intranet, local area network, mobile communication network and a combination thereof.

Figure 8:
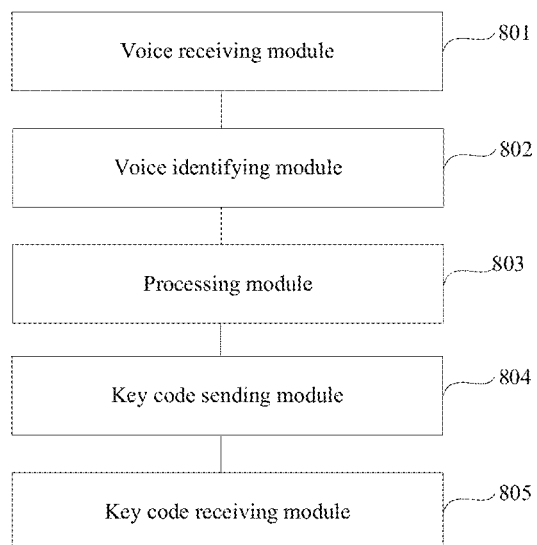
FIG. 8 is a schematic structural diagram of a device for converting a voice input to a text input according to another embodiment of the present application.

One or more modules are stored in the memory 12, which, when being executed by the at least one processor 11, perform the method for converting a voice input to a text input according to any of the above method embodiments, for example, performing steps 301 to 305 in the method as illustrated in FIG. 3, and implementing the functions of the modules 801 to 805 as illustrated in FIG. 8.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

The electronic equipment in the embodiments of the present application is practiced in various forms, including, but not limited to:

(1) a mobile communication device: which has the mobile communication function and is intended to provide mainly voice and data communications; such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, an MID, an UMPC device and the like, for example, an iPad;

(3) a portable entertainment device: which displays and plays multimedia content; such equipments include: an audio or video player (for example, an iPod), a palm game machine, an electronic book, and a smart toy, and a portable vehicle-mounted navigation device; and (4) a server: which provides services for computers, and includes a processor, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device; and (5) another electronic equipment having the data interaction function.

An embodiment of the present application further provides a non-volatile computer-readable storage medium. The computer-readable storage medium stores computer-executable instructions, which, when being executed by at least one processor, may cause the at least one processor to perform steps 301 to 305 in the method as illustrated in FIG. 3, and implementing the functions of the modules 801 to 805.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A method for converting a voice input to a text input, being applied to a voice input apparatus, the voice input apparatus comprising:

a sound signal receiving unit, configured to receive a sound signal;

a voice signal acquiring unit, communicably connected to the sound signal receiving unit, and configured to process the sound signal to acquire a voice signal;

a sending unit, communicably connected to the voice signal acquiring unit, and configured to send the voice signal to a host;

a receiving unit, configured to receive a key code from the host;

a decoding unit, connected to the receiving unit, and configured to convert the key code to an identification code that is identified by the host; and a communication unit, connected to the decoding unit, and configured to send the identification code to the host;

the method comprising:

acquiring, by the voice input apparatus, a voice signal;

sending, by the voice input apparatus, the voice signal to a host, so that the host converts the voice signal to a corresponding text character, and processes the text character to generate a key code;

receiving, by the voice input apparatus, the key code from the host;

converting, by the voice input apparatus, the key code to an identification code that is identified by the host; and sending, by the voice input apparatus, the identification code to the host, so that the host inputs the text character.

2. The method according to claim 1, wherein the key code comprises a key code corresponding to a text character or a key code corresponding to a paste command.

3. A method for converting a voice input to a text input, being applied to a host, the method comprising:

receiving, by the host, a voice signal from a voice input apparatus;

converting, by the host, the voice signal to a corresponding text character;

processing, by the host, the text character to generate a key code;

sending, by the host, the key code to the voice input apparatus, so that the voice input apparatus converts the key code to an identification code that is identified by the host; and receiving, by the host, the identification code from the voice input apparatus to input the text character.

4. The method according to claim 3, wherein the processing the text character to generate a key code comprises:

converting the text character to a key code corresponding to the text character.

5. The method according to claim 3, wherein the processing the text character to generate a key code comprises:

pasting the text character to a clipboard to generate a key code corresponding to the paste command.

6. A voice input apparatus, comprising:

a sound signal receiving unit, configured to receive a sound signal;

a voice signal acquiring unit, communicably connected to the sound signal receiving unit, and configured to process the sound signal to acquire a voice signal;

a sending unit, communicably connected to the voice signal acquiring unit, and configured to send the voice signal to a host, so that the host converts the voice signal to a corresponding text character, and processes the text character to generate a key code;

a receiving unit, configured to receive the key code from the host;

a decoding unit, connected to the receiving unit, and configured to convert the key code to an identification code that is identified by the host; and a communication unit, connected to the decoding unit, and configured to send the identification code to the host, so that the host inputs the text character.

7. An electronic equipment, comprising:

at least one processor; and a memory communicably connected to the at least one processor; wherein the memory stores instructions executable by the at least one processor, wherein, the instructions, when being executed by the at least one processor, cause the at least one processor to perform the method of claim 3.

8. A non-volatile computer-readable storage medium, wherein the computer-readable storage medium stores computer-executable instructions, which, when being executed by an electronic equipment, cause the electronic equipment to perform the method of claim 3.

* * * * *